(12) United States Patent
Kumahashi

(10) Patent No.: US 11,792,346 B2
(45) Date of Patent: *Oct. 17, 2023

(54) IMAGE PROCESSING APPARATUS, METHOD OF CONTROLLING IMAGE PROCESSING APPARATUS, AND STORAGE MEDIUM

(71) Applicant: CANON KABUSHIKI KAISHA, Tokyo (JP)

(72) Inventor: Shu Kumahashi, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/837,985

(22) Filed: Jun. 10, 2022

(65) Prior Publication Data
US 2022/0303418 A1 Sep. 22, 2022

Related U.S. Application Data

(63) Continuation of application No. 16/889,581, filed on Jun. 1, 2020, now Pat. No. 11,405,518.

(30) Foreign Application Priority Data

Jun. 5, 2019 (JP) ................................ 2019-105690

(51) Int. Cl.
*H04N 1/40* (2006.01)
*H04N 1/00* (2006.01)
*G06F 16/51* (2019.01)

(52) U.S. Cl.
CPC ......... *H04N 1/00811* (2013.01); *G06F 16/51* (2019.01); *H04N 1/00331* (2013.01)

(58) Field of Classification Search
CPC .......... H04N 1/00811; H04N 1/00331; H04N 1/00328; G06F 16/51
See application file for complete search history.

(56) References Cited

U.S. PATENT DOCUMENTS 11,477,331 B2 * 10/2022 Kobayashi ......... H04N 1/00331
2008/0231914 A1 * 9/2008 Motoyoshi ......... H04N 1/00482
358/1.16
2008/0273802 A1 * 11/2008 Takebe ................. G06V 30/262
382/229

(Continued)

*Primary Examiner* — Moustapha Diaby
(74) *Attorney, Agent, or Firm* — Canon U.S.A., Inc. IP Division

(57) ABSTRACT

An image processing apparatus includes a character recognition unit configured to perform character recognition processing for recognizing a character string included in image data, a transmission unit configured to transmit the image data to store the image data in a folder including a name containing the character string acquired by the character recognition processing, and a reception unit configured to receive an instruction from a user. In a case where a result of the character recognition processing by the character recognition unit does not satisfy a predetermined condition, the transmission unit does not transmit the image data until the reception unit receives the instruction from the user. In a case where the result of the character recognition processing by the character recognition unit satisfies the predetermined condition, the transmission unit transmits the image data without receiving the instruction from the user by the reception unit.

30 Claims, 14 Drawing Sheets

(56) References Cited

U.S. PATENT DOCUMENTS

| | | | |
|---|---|---|---|
| 2011/0051179 A1* | 3/2011 | Iga | H04N 1/32096 358/1.15 |
| 2011/0221782 A1* | 9/2011 | Ito | G06F 16/93 345/671 |
| 2019/0197305 A1* | 6/2019 | Kanada | G06V 30/40 |
| 2020/0076964 A1* | 3/2020 | Man | H04N 1/00358 |

* cited by examiner

FIG.5

| DEVICE SERIAL No: abcd0101 | | |
|---|---|---|
| APPLICATION MANAGEMENT | ONE-TOUCH TRANSMISSION SCAN | |

ONE-TOUCH TRANSMISSION SCAN ~500

APPLICATION INFORMATION ~501

VERSION  0100

REGISTERED INFORMATION MANAGEMENT

REGISTERED BUTTONS

REGISTRATION OF NEW BUTTON ~502

| BUTTON NAME ~503 | TRANSMISSION TYPE ~504 | ~505 | ~506 | ~507 |
|---|---|---|---|---|
| | | | DISPLAY STATE | |
| APPLICATION A | E-MAIL | NON-DISPLAY | DISPLAY | DELETE |
| APPLICATION B | USB MEMORY | NON-DISPLAY | DISPLAY | DELETE |
| REFERRAL LETTER | FILE | DISPLAY | NON-DISPLAY | DELETE |
| INTERVIEW SHEET | FILE | DISPLAY | NON-DISPLAY | DELETE |

FIG.6

DEVICE SERIAL No: abcd0101
APPLICATION MANAGEMENT    ONE-TOUCH TRANSMISSION SCAN > DETAILED INFORMATION ON BUTTON > BUTTON EDIT

BUTTON EDIT ~600

612 — OK  CANCEL ~613

DETAILED INFORMATION ON BUTTON

BASIC SETTING
- BUTTON NAME: [INTERVIEW SHEET] ~601
  - ☐ DISPLAY CHECK SCREEN BEFORE EXECUTION

- FILE NAME: [BUTTON NAME ▼] ~602
  [AUTOMATIC]

- KEYWORD:  603 ~ ◉ VALID  [KEYWORD CHARACTER STRING SETTING] ~604

- ICON: ☑ 📋  ☐ 📝  ☐ 📄  ☐ 📰  ☐ ⚠️

- SORT: [DO NOT SORT ▼] ~605
  [SORT (FILE)]
  [SORT (FOLDER)]
  [SORT (FILE AND FOLDER)]

- TRANSMISSION TYPE: [FILE ▼]   [SWITCHING] ~607
  [E-MAIL]
  606 [USB MEMORY]

608 — TRANSMISSION SETTING (FILE)

- TRANSMISSION DESTINATION: [¥¥FILE SERVER¥INTERVIEW SHEET]  [SELECT FROM ADDRESS BOOK...]
  - READING SIZE: [A4 ▼]         609            610
  - COLOR MODE: [COLOR ▼]
  - FILE FORMAT: [PDF ▼] ~611
    - ENCRYPTED PDF: [EQUIVALENT TO Acrobat 100/256-bit AES ▼]
    - ☐ PASSWORD SET/CHANGE
      - PASSWORD: [_____]
      - CONFIRMATION INPUT: [_____]
    - ELECTRONIC SIGNATURE: [NONE ▼]
    - ☐ DIVIDE IN EACH PAGE
  - DENSITY: [0 ▼]
  - DOCUMENT DIRECTION: [VERTICALLY LONG DOCUMENT ▼]
  - DOCUMENT TYPE: [CHARACTER/PHOTOGRAPH ▼]
  - BOTH-SIDE DOCUMENT: [HORIZONTAL OPEN ▼]
  - SHARPNESS: [0 ▼]
  - DATA SIZE: [LARGE: IMAGE QUALITY PRIORITY ▼]

SETTING MENU IS SWITCHED DEPENDING ON TRANSMISSION TYPE

| DEVICE SERIAL No: abcd0101 | |
|---|---|
| APPLICATION MANAGEMENT | ONE-TOUCH TRANSMISSION SCAN > DETAILED INFORMATION > BUTTON EDIT > KEYWORD SETTING |

KEYWORD SETTING SCREEN   710   711

[OK]   [CANCEL]

CHARACTER RECOGNITION CONDITION

CHARACTER RECOGNITION SETTING

CHARACTER TYPE: [ONLY NUMERALS ▼] ~701

NUMBER OF CHARACTERS

LOWER LIMIT: [3] ~702
UPPER LIMIT: [10] ~703

CHARACTER EXTRACTING POSITION
FROM UPPER LEFT OF DOCUMENT

X COORDINATE: [10 cm] ~704
Y COORDINATE: [20 cm] ~705
WIDTH: [15 cm] ~706
HEIGHT: [5 cm] ~707

OPERATION AT OCCURRENCE OF ERROR: [INTERRUPT ▼] ~708

TRANSMISSION DESTINATION OF DATA AT OCCURRENCE OF ERROR: [          ] ~709

FIG.8

DEVICE SERIAL No: abcd0101
APPLICATION MANAGEMENT

ONE-TOUCH TRANSMISSION SCAN > DETAILED INFORMATION > BUTTON EDIT > SELECT FROM ADDRESS BOOK
SELECT FROM ADDRESS BOOK ～800

SELECT ADDRESS FROM ADDRESS BOOK AND CLICK [OK].

| | | | | 805 | 806 |
| --- | --- | --- | --- | --- | --- |
| | | | | OK | CANCEL |

ADDRESS BOOK
TYPE: BEST MEMBER ▼   SWITCH DISPLAY — 802
801

| SELECT | NUMBER | TYPE | NAME | DESTINATION |
| --- | --- | --- | --- | --- |
| ☒ | 01 | ✉ | email_a | email_a@sample.co.jp |
| ☒ | 02 | ✉ | email_b | email_b@sample.co.jp |
| ⊕ | 03 | 📄 | REFERRAL LETTER | ¥¥FILE SERVER¥REFERRAL LETTER |
| ☐ | 04 | 📄 | INTERVIEW SHEET | ¥¥FILE SERVER¥INTERVIEW SHEET |

803
804

IMAGE PROCESSING APPARATUS, METHOD OF CONTROLLING IMAGE PROCESSING APPARATUS, AND STORAGE MEDIUM

CROSS REFERENCE TO RELATED APPLICATIONS

The present application is a continuation of U.S. patent application Ser. No. 16/889,581, filed on Jun. 1, 2020, which claims priority from Japanese Patent Application No. 2019-105690, filed Jun. 5, 2019, each of which are hereby incorporated by reference herein in their entirety.

BACKGROUND

Technical Field

The present disclosure relates to an image processing apparatus, a method of controlling the image processing apparatus, and a storage medium.

Description of the Related Art

There has been discussed an image processing apparatus that reads an image of a document to generate an image data, performs character recognition processing on an area previously designated by a user, and transmits the image data to a folder having a folder name as a character string acquired by the character recognition processing (Japanese Patent Application Laid-Open No. 2005-234708).

In an image processing apparatus that stores the image data in the folder including, as a folder name. The character string acquired by the character recognition processing, in a case where an incorrect character string is acquired by the character recognition processing, the image data is stored in a folder including a folder name that is not intended by the user. There is also a possibility that image data of a confidential document may be transmitted to an unintended folder, which can lead to leakage of confidential information.

In order to prevent the image data from being transmitted to an unintended folder, the user can be asked to confirm the folder name before the image data is stored. However, this increases labor and complicated operation of the user.

The image processing apparatus discussed in Japanese Patent Application Laid-Open No. 2005-234708 fails to ask the user to conform the folder name before the image data is stored, or cannot prevent the image data from being transmitted to an unintended folder.

SUMMARY

An aspect of present disclosure is to prevent an image data from being transmitted to an unintended folder in an image processing apparatus that stores image data in a folder including a folder name, and a character string acquired by character recognition processing.

According to an aspect of the present disclosure, an image processing apparatus includes a character recognition unit configured to perform character recognition processing for recognizing a character string included in an image data, a transmission unit configured to transmit the image data to store the image data in a folder including a name containing the character string acquired by the character recognition processing, and a reception unit configured to receive an instruction from a user. In a case where a result of the character recognition processing by the character recognition unit does not satisfy a predetermined condition, the transmission unit does not transmit the image data until the reception unit receives the instruction from the user. In a case where the result of the character recognition processing by the character recognition unit satisfies the predetermined condition, the transmission unit transmits the image data without receiving the instruction from the user by the reception unit.

Further features and aspects of the present disclosure will become apparent from the following description of exemplary embodiments with reference to the attached drawings.

BRIEF DESCRIPTION OF THE DRAWINGS

FIG. 5 is a diagram illustrating an example of a one-touch transmission scan setting screen displayed on a display device.

FIG. 6 is a diagram illustrating an example of a setting editing screen for editing settings of a button to perform one-touch transmission scan.

FIG. 7 is a diagram illustrating an example of a character recognition processing setting screen.

FIG. 8 is a diagram illustrating an example of an address selection screen.

DESCRIPTION OF THE EMBODIMENTS

Exemplary embodiments are described below with reference to the drawings. Configurations described in the following exemplary embodiments are mere examples, and are not limited to the described configurations.

Figure 1:
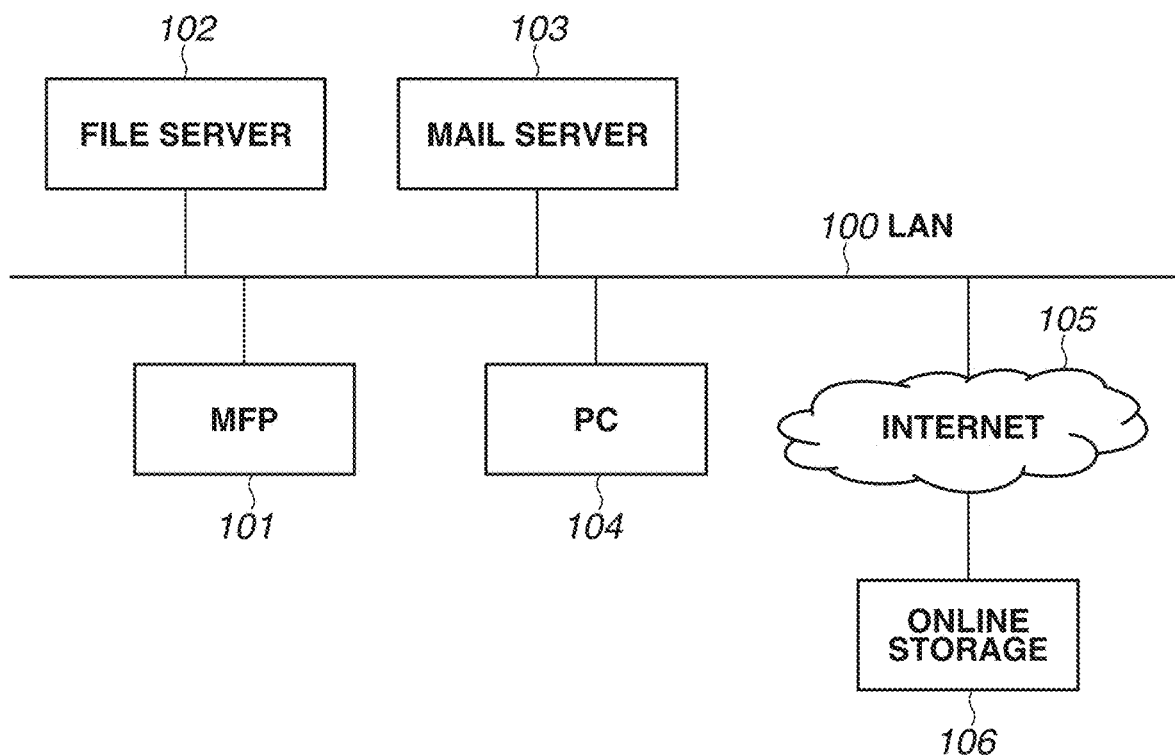
FIG. 1 is a diagram illustrating an example of a configuration of a reading system.

A first exemplary embodiment will be described. FIG. 1 is a diagram illustrating an example of a configuration of a reading system. The reading system according to the present exemplary embodiment includes a multifunctional peripheral (MFP) 101 as an example of an image processing apparatus, a file server 102 as an information processing apparatus, a mail server 103, a personal computer (PC) 104 and an online storage 106. The MFP 101, the file server 102, the mail server 103, and the online storage 106 are each connected to a local area network (LAN) 100. On the LAN 100, the MFP 101, the file server 102, the mail server 103, and the PC 104 are communicably connected to one another via the network. The MFP 101 and the online storage 106 are communicable with each other via the LAN 100 and the Internet 105.

The MFP 101 transmits image data generated through reading of an image of a document to the file server 102, the mail server 103, and the online storage 106. The image data in the present exemplary embodiment is not limited to electronic data obtained by converting an image into raw data, and may be electronic data conforming to an image format such as tagged image file format (TIFF) and Joint Photographic Experts Group (JPEG), or electronic data conforming to a portable document format (PDF) format. The file server 102 is a file server that complies with file transfer protocol (FTP) and server message block (SMB) protocol. The mail server 103 is a mail server that complies with simple mail transfer protocol (SMTP). The online storage 106 is an online storage that complies with a world wide web distributed authoring and versioning (WebDAV) (file sharing protocol using hypertext transfer protocol (HTTP)). The PC 104 can access a web server of the MFP 101 by using the HTTP, and can refer to and update setting values. The LAN 100 may be a wired LAN using Ethernet® or a wireless LAN.

Figure 2:
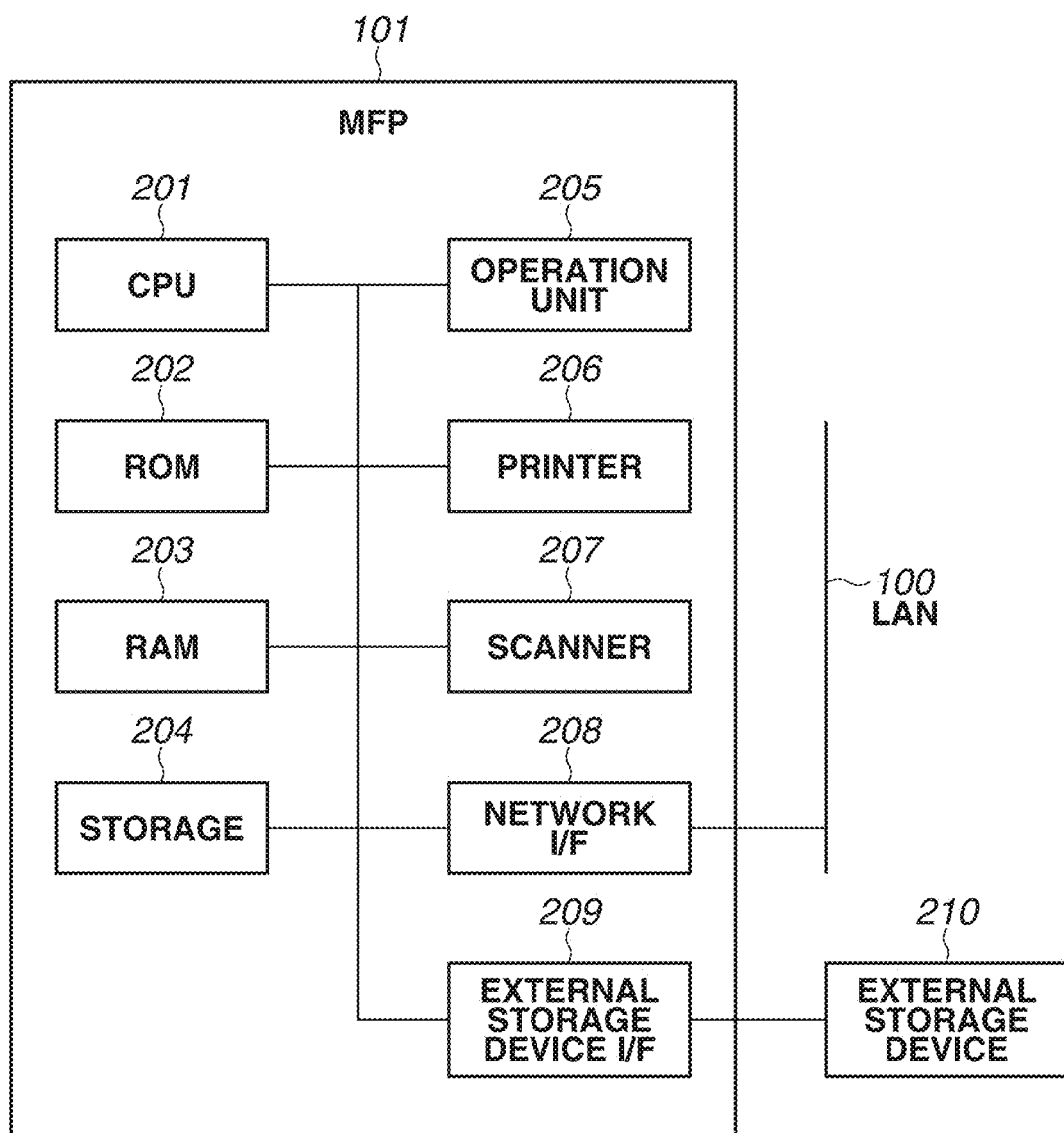
FIG. 2 is a diagram illustrating an example of a hardware configuration of a multifunctional peripheral (MFP).

FIG. 2 is a diagram illustrating an example of a hardware configuration of the MFP 101. The MFP 101 includes a central processing unit (CPU) 201, a read-only memory (ROM) 202, a random access memory (RAM) 203, a storage 204, an operation unit 205, a printer 206, a scanner 207, a network interface (I/F) 208, and an external storage device I/F 209.

The CPU 201 controls various kinds of hardware 202 to 208 of the MFP 101, thereby realizing functions of the MFP 101. The CPU 201 transmits signals to the various kinds of hardware via a bus line, thereby realizing mutual data communication therewith.

Further, the CPU 201 of the MFP 101 controls operation of the MFP 101 based on a control program stored in the ROM 202. More specifically, the CPU 201 executes an operating system (OS) controlling the MFP 101 and a driver program to control the hardware. Further, application programs on the OS mutually operate on each other to operate and control a function desired by a user. The OS and the various kinds of programs are stored in the ROM 202, and are executed by being read to the RAM 203.

The ROM 202 is a memory that stores the programs and various kinds of data to be used by the CPU 201. The RAM 203 is a work memory that temporarily stores the programs and data to be used by the CPU 201 for calculation. The storage 204 is a storage device that stores various kinds of data, various kinds of programs, etc.

Although, in the present exemplary embodiment, a flash memory is assumed to be used as the storage 204, an auxiliary storage device, such as a solid state disk (SSD), a hard disk drive (HDD), and an embedded multi-media card (eMMC), may also be used. In the MFP 101 according to the present exemplary embodiment, a single CPU 201 uses one memory (RAM 203) to perform various processing illustrated in a flowchart described below; however, other configurations may also be used. For example, a plurality of CPUs, a plurality of RAMs, a plurality of ROMs, and a plurality of storages may cooperate with one another to perform the various processing illustrated in the flowchart described below. Further, a part of the processing may be performed by a hardware circuit, such as an application specific integrated circuit (ASIC) and a field programmable gate array (FPGA).

The operation unit 205 is a user interface for the user to operate the MFP 101, for example, a touch panel, and also serves as a reception unit receiving operation and input by the user. The operation unit 205 can be also used as a display unit that displays a screen to operate the MFP 101.

The printer 206 is a unit realizing a print function. The CPU 201 controls the printer 206 to execute a print job received from the PC 104, so that an image is printed on a sheet. The print job is data that includes an instruction to cause the MFP 101 to perform print processing, image data, and print setting information.

The scanner 207 is a unit realizing a scan function. When the CPU 201 controls the scanner 207, the scanner 207 optically reads an image of a document, and generates image data.

The network I/F 208 is a network I/F for performing communication using a wired LAN, for example, Ethernet®. The network I/F 208 may be a network I/F for performing communication using a wireless LAN, or may be a universal serial bus (USB)-LAN I/F.

The external storage device I/F 209 is an I/F for the MFP 101 to communicate with an external storage device 210. The CPU 201 controls the external storage device I/F 209 such that the image data is stored in the external storage device 210. In the present exemplary embodiment, a USB interface is assumed to be used as the external storage device I/F 209 and a USB memory is assumed to be used as the external storage device 210. However, the external storage device I/F 209 may be a secure digital (SD) card slot, such as an SD card, for communication with an external storage device.

Figure 3:
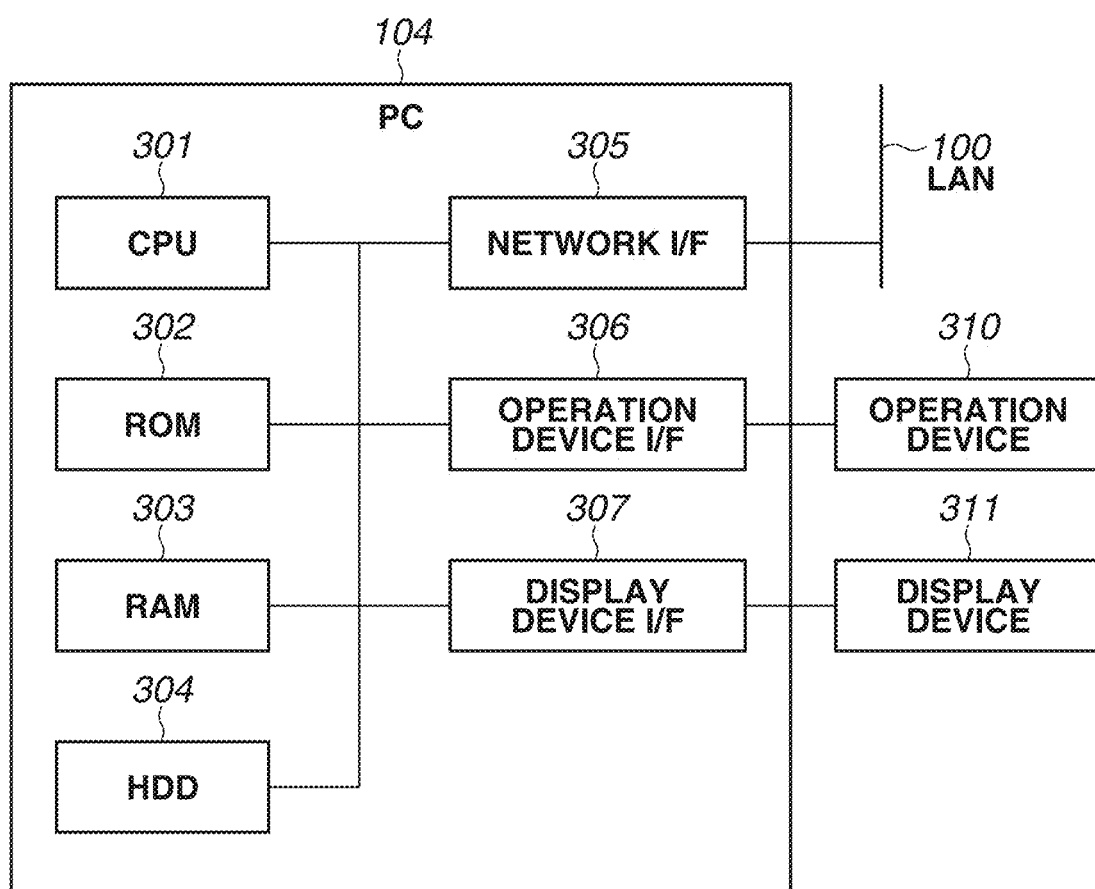
FIG. 3 is a diagram illustrating an example of a hardware configuration of a personal computer (PC).

FIG. 3 is a diagram illustrating an example of a hardware configuration of the PC 104. The PC 104 includes a CPU 301, a ROM 302, a RAM 303, an HDD 304, a network I/F 305, an operation device I/F 306, and a display device I/F 307.

The CPU 301 controls various kinds of hardware 302 to 307 of the PC 104, thereby realizing functions of the PC 104. The CPU 301 transmits signals to the various kinds of hardware via a bus line, thereby realizing mutual data communication therewith.

Further, the CPU 301 of the PC 104 controls operation of the PC 104 based on a control program stored in the ROM 302. More specifically, the CPU 301 executes an OS controlling the PC 104, and application programs on the OS mutually operate on each other to operate and control a function desired by the user. The OS and the various kinds of programs are stored in the ROM 302, and are executed by being read to the RAM 303.

The ROM 302 is a memory that stores the programs and various kinds of data to be used by the CPU 301. The RAM 303 is a work memory that temporarily stores the programs and data to be used by the CPU 301 for calculation. The HDD 304 is a storage device that stores various kinds of data, various kinds of programs, etc.

The network I/F 305 is a network I/F for performing communication using a wired LAN, for example, Ethernet®. The network I/F 305 may be a network I/F for performing communication using a wireless LAN, or may be a USB-LAN I/F.

The operation device I/F 306 is an I/F to connect an operation device 310, such as a keyboard and a mouse, to the PC 104.

The display device I/F 307 is an I/F that connects a display device 311, such as a liquid crystal monitor, to the PC 104.

The PC 104 according to the present exemplary embodiment is connected to the external operation device and the external display device. However, an operation unit and a display unit can be incorporated in the PC 104 as well.

Figure 4:
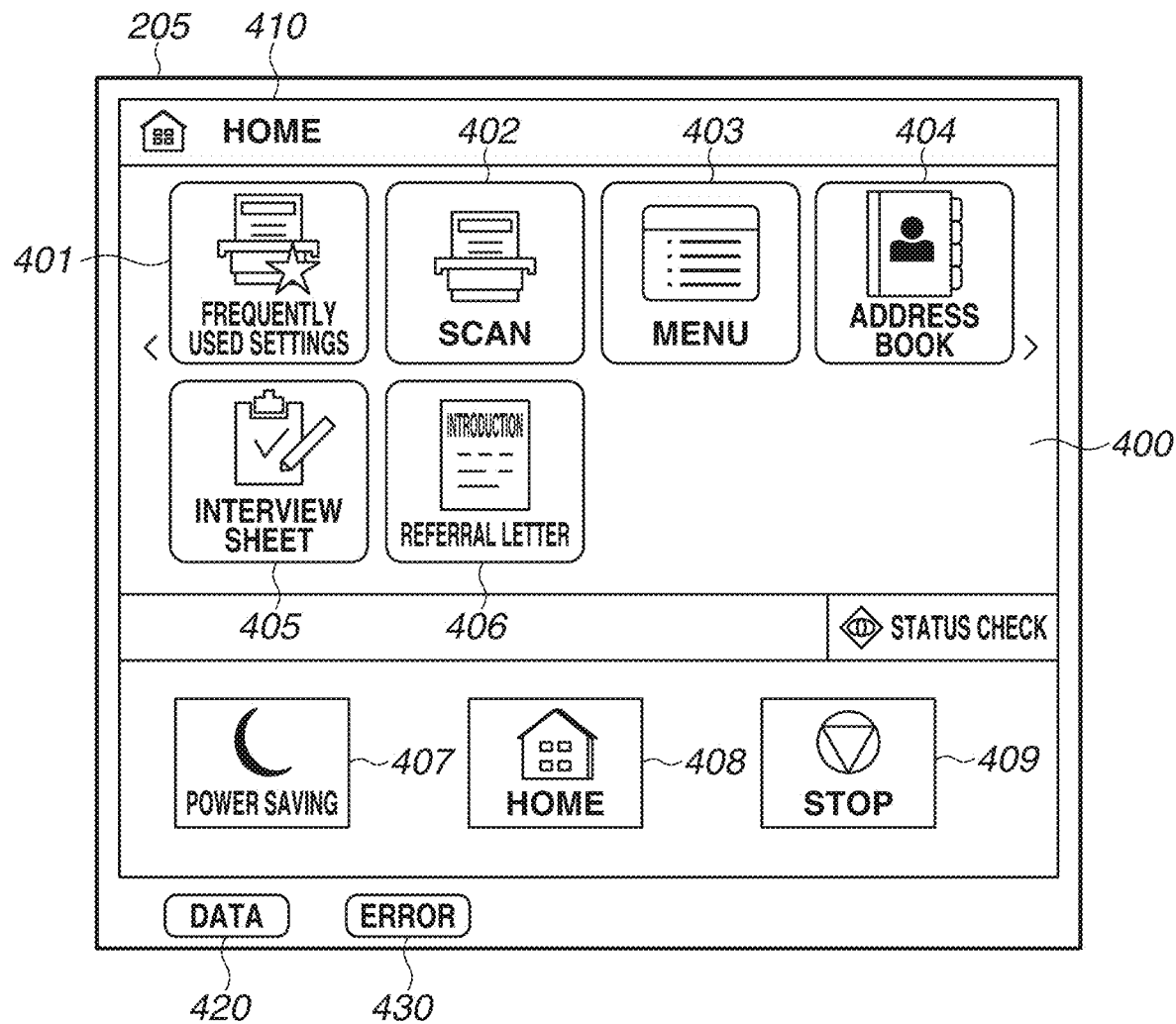
FIG. 4 is a diagram illustrating an example of a screen displayed on an operation unit.

FIG. 4 is a diagram illustrating an example of a screen displayed on the operation unit 205. The operation unit 205 includes a touch panel 410, a data light-emitting diode (LED) 420, and an error LED 430. A home screen 400 is displayed on the touch panel 410 upon starting the MFP 101. The home screen 400 is a screen for instructing execution of each of the functions of the MFP 101. A frequently used settings button 401, a scan button 402, a menu button 403, an address book button 404, an interview sheet button 405, a referral letter button 406, and the like are displayed on the home screen 400. Further, a power saving button 407, a home button 408, and a stop button 409 are constantly displayed on the home screen 400. The power saving button 407, the home button 408, and the stop button 409 may be provided as hardware keys on the operation unit 205.

When the frequently used settings button 401 is selected by the user, an execution screen for executing a specific function is displayed in a state where setting set by the user is input.

When the scan button 402 is selected, a screen where a user can give an instruction to execute scan processing to generate image data and transmit the generated image data by means of email transmission or file transmission, and to store the generated image data in the external storage device 210 is displayed. The email transmission indicates that the image data generated by reading the document is attached to an electronic mail and transmitted. The file transmission indicates that the generated image data is transmitted to the file server 102 or the PC 104 by using a communication protocol, such as SMB and FTP.

When the menu button 403 is selected by the user, a menu screen is displayed.

When the address book button 404 is selected by the user, a screen displaying a registered address (destination information) is displayed. The screen displaying the address also displays a type of transmission, such as electronic mail transmission, SMB transmission, FTP transmission, and WebDAV transmission, and the destination information, such as an email address, a host name, and server information.

Each of the interview sheet button 405 and the referral letter button 406 is a one-touch transmission button. When the one-touch transmission button is selected by the user, a screen where the user can give an instruction to read an image of a document with scan settings preset by the user to generate image data, and to transmit the generated image data by the type of transmission preset by the user is displayed. In other words, selection of the interview sheet button 405 means reception of an instruction to perform reading.

When the power saving button 407 is selected by the user, the MFP 101 is shifted to a power saving state.

When the home button 408 is selected by the user, the home screen 400 is displayed on the operation unit 205.

When the stop button 409 is selected by the user, execution of a job, e.g., a print job being executed by the MFP 101, is canceled. Alternatively, when the stop button 409 is selected by the user, execution of a copy job or a transmission job may be canceled.

The data LED 420 and the error LED 430 notify the user of the state of the MFP 101. The data LED 420 is turned on while the electronic mail transmission or the file transmission is being performed. The error LED 430 is turned on when an error occurs on the MFP 101.

The home screen 400 is a function selection screen for the user to select a function that the user desires to use from a plurality of functions including, for example, a copy function for executing printing based on the image data, and a transmission function for reading a document to generate image data and transmitting the image data to an external device.

FIG. 5 is a diagram illustrating an example of a one-touch transmission scan setting screen displayed on the display device 311.

For example, a one-touch transmission scan setting screen 500 of FIG. 5 is displayed on the display device 311 connected to the PC 104 that accesses the web server of the MFP 101 by HTTP communication.

In the one-touch transmission scan setting screen 500, an application information area 501, a registration of new button 502, items 503 to 505, display/non-display switching buttons 506, and delete buttons 507 are displayed.

The application information area 501 is an area where a version of an application is displayed, and a version number 1.00 is displayed in FIG. 5.

When the registration of new button 502 is selected by the user, a button that is to be displayed on the screen displayed on the operation unit 205 in order to perform one-touch transmission scan is newly registered. When the registration of new button 502 is selected, a button setting editing screen 600 of FIG. 6 is displayed on the display device 311. Detailed description of the button setting editing screen 600 of FIG. 6 will be provided below.

The item 503 indicates a name of a button for performing the one-touch transmission scan registered in the MFP 101.

The item 504 indicates a type of transmission type set to the button for performing the one-touch transmission scan registered in the MFP 101.

The item 505 indicates a display state of the button to perform the one-touch transmission scan registered in the MFP 101. Further, the display/non-display switching button 506 for changing the display state, and the delete button 507 are also displayed. For example, when the display state of the "referral letter" button indicates "display", the referral letter button 406 of FIG. 4 is displayed on the home screen 400 of the touch panel 410. The display/non-display switching button 506 is a toggle button to select "display" or "non-display".

When the delete button 507 is selected by the user, information on the button registered in the MFP 101 is deleted.

An example of the button for performing the one-touch transmission scan registered in the MFP 101 is a button that has a name of "application A". The type of transmission for the button is E-mail, and the display state thereof indicates "non-display". The button setting editing screen 600 of FIG. 6 is displayed on the display device 311 not only when the registration of new button 502 is selected but also when the button having the name of "application A" is selected.

In FIG. 5, four buttons of "application A", "application B", "referral letter", and "interview sheet" have been registered. Since the display state of each of the buttons "referral letter" and "interview sheet" is set to "display", the buttons of "referral letter" and "interview sheet" are displayed on the home screen 400. Since the display state of each of the buttons of "application A" and "application B" is set to "non-display", in contrast, the buttons of "application A" and "application B" are not displayed on the home screen 400.

FIG. 6 is a diagram illustrating an example of the setting editing screen for editing the settings of the button for performing the one-touch transmission scan. For example, the button setting editing screen 600 of FIG. 6 is displayed on the display device 311 connected to the PC 104 that accesses the web server of the MFP 101 through the HTTP communication.

The button setting editing screen 600 is displayed when the registration of new button 502 of FIG. 5 or any one of the button name 503 is selected by the user. In a case where the button setting editing screen 600 is displayed when the button name is selected by the user, the button setting editing screen 600 is displayed in a state where a value set last time is input in each of the items. In a case where the button setting editing screen 600 is displayed when the registration of new button 502 is selected, the button setting editing screen 600 is displayed in a state where no value is input in any of the items. A default value may be previously input in each of the items of the button setting editing screen 600.

An input field 601 is an input field for setting the name of the one-touch transmission button. In the input field 601, a character string "interview sheet" has been input. When the one-touch transmission button is selected by the user, the one-touch transmission scan is performed.

A pull-down menu 602 is an object for setting a file name. In the pull-down menu 602, "button name" or "automatic" is selectable. In a case where the "button name" is selected, the button name input in the input field 601 is used as a name of a file to be transmitted. In a case where "automatic" is selected, a character string automatically determined is used as the name of the file. For example, a date when the one-touch transmission button registered on the screen of FIG. 6 is selected and scan is performed is used as the name of the file.

When a check box 603 is checked, a keyword at the time when the file is output is enabled. In other words, a function for using the character string that has been recognized and acquired by the character recognition processing as the name of the folder to which the image data is transmitted is enabled. In the present exemplary embodiment, an example of the interview sheet button 405 in the case where the check box 603 is checked will be described, and the description of an operation in a case where the check box 603 is not checked will be omitted in the flowchart described below.

When a keyword character string setting button 604 is selected by the user, a keyword character string setting screen 700 of FIG. 7 is displayed.

A pull-down menu 605 is an object for making settings regarding whether to sort a file to be transmitted and how to sort the file. In the pull-down menu 605, one of "do not sort", "sort (file)", "sort (folder)", and "sort (file and folder)" is selectable. In a case where "do not sort" is set, the image data is transmitted to a folder of a transmission destination folder path displayed in an area 609 described below. In a case where "sort (file)" is set, a keyword is included in an output file name. In a case where "sort (folder)" is set, the keyword is included in a name of a folder in which the file is stored. In a case where "sort (file and folder)" is set, the keyword is included in a file name and a name of a folder to which the file is output. In the present exemplary embodiment, an example of the interview sheet button 405 in the case where "sort (folder)" is set will be described, and description of operation in a case where the other option is selected will be omitted in the flowchart described below.

A pull-down menu 606 is an object for selecting the type of transmission when the image data generated by reading is transmitted. In the pull-down menu 606, "file", "E-mail", or "USB memory" is selectable. In a case where "file" is selected and a switching button 607 is selected, the image data is transmitted to the folder of the PC 104 or the file server 102 by using a protocol, such as SMB, FTP, WebDAV, and SFTP protocols. In a case where "E-mail" is selected, the image data is transmitted to the destination by using simple mail transfer protocol (SMTP). In a case where "USB memory" is selected, the image data is stored in the USB memory, i.e., the external storage device 210 connected to the MFP 101. In the present exemplary embodiment, an example of the interview sheet button 405 in the case where "file" is set is described, and the description of an operation in a case where the other option is selected is omitted in the flowchart described below.

The switching button 607 is a button for switching the setting of the type of transmission to the type of transmission displayed in the pull-down menu 606. When the switching button 607 is selected in a state where the type of transmission is selected in the pull-down menu 606, content corresponding to the selected type of transmission is displayed in an item 608.

The item 608 is an item where various kinds of settings such as a read setting at reading in the one-touch transmission scan and a transmission setting at transmitting the image data can be input. Settings of a transmission destination, a reading size, a file format, a document read direction, etc. can be also input in the item 608.

The area 609 is an area for displaying the transmission destination to which the image data generated by reading is transmitted. The destination set in the area is a folder path to be combined with a character string of a text object described below. Further, the area 609 is a text area where inputting and editing are not allowed, and displays an address selected in an address selection screen.

When a select from address book button 610 is selected by the user, an address selection screen 800 of FIG. 8 where an address is selectable from an address book stored in the MFP 101 is displayed.

A pull-down menu 611 is a pull-down menu for setting a file format when the data generated by reading the image of the document is made into a file. The file is generated based on the format selected in the pull-down menu 611.

An OK button 612 is a button for storing the content set in the button setting editing screen 600 as the settings of the one-touch transmission button in the storage 204. When the OK button 612 is selected, the settings are stored in the storage 204. A cancel button 613 is a button for discarding the setting. When the OK button 612 or the cancel button 613 is pressed, the one-touch transmission scan setting screen 500 of FIG. 5 is displayed.

FIG. 7 is a diagram illustrating an example of a character recognition processing setting screen. The keyword character string setting screen 700 of FIG. 7 is displayed on the display device 311 when the keyword character string setting button 604 of FIG. 6 is selected.

A pull-down menu 701 is an object for setting a predetermined condition of a type of the character string acquired by the character recognition processing. Although, in the screen illustrated in FIG. 7, "only numerals" is displayed, a selectable option is not limited thereto. For example, "only alphabets", "only numerals and alphabets", "only hiragana", "only kanji characters", "only kanji characters and hiragana", or the like may be selectable. In a case where a character string not satisfying the condition selected in the pull-down menu is acquired, the image data is handled as image data on which a character recognition error has occurred. Details thereof will be described below.

An input field 702 is an object for setting a lower limit of the number of characters of the character string acquired by the character recognition processing. An input field 703 is an object for setting an upper limit of the number of characters of the character string acquired by the character recognition processing. In a case where a character string not satisfying the input condition is acquired, the image data is handled as image data on which a character recognition error has occurred. Details thereof will be described below.

Input fields 704 to 707 are objects for setting a range of coordinates of the image data where the character recognition processing is performed. The character recognition processing described below is performed based on values input in the input fields 704 to 707. Although, in the present exemplary embodiment, an X coordinate and a Y coordinate of a starting point, a width, and a height of the character recognition area are designated in centimeters with an upper left of the document as reference, the character recognition area may be also designated in millimeters or inches. Alternatively, the character recognition area may be designated using a preview image of the document and a graphical user interface (GUI), in place of designation by numeric values. Further, in the present exemplary embodiment, an area where a patient identification (ID) of the interview sheet is entered is set as the character recognition area.

A pull-down menu 708 is an object for making a setting regarding whether to interrupt or continue the one-touch transmission scan processing in a case where the image data in which the character string not satisfying the condition of the character type or the number of characters is acquired, i.e., the image data on which a character recognition error has occurred is present. In FIG. 7, although an option of "interrupt" is displayed, an option of "continue" is alternatively selectable.

An input field 709 is an object for inputting the transmission destination (folder) of the image data on which the character recognition error has occurred in a case where "continue" is selected in the pull-down menu 708. For example, a folder path is input in the input field 709. In FIG. 7, since "interrupt" is selected, the input field 709 is displayed in a gray-out state. Performing settings in the above-described manner can produce the following effect. An operation suitable for usage by the user can be set. For example, "interrupt" can be set in a case where the number of documents is small or in order to surely sort the image data, and "continue" can be set in a case where the number of documents is large or in a case where the user wants to manually sort the image data that has failed in sorting.

When an OK button 710 is selected by the user, the setting selected or input at this time is stored in the storage 204.

When a cancel button 711 is selected by the user, the setting selected or input at this time is discarded, and the button setting editing screen 600 is displayed on the display device 311.

FIG. 8 is a diagram illustrating an example of the address selection screen 800. The address selection screen 800 is displayed when the select from address book button 610 in the button setting editing screen 600 of FIG. 6 is selected. For example, the address selection screen 800 of FIG. 8 is displayed on the display device 311 connected to the PC 104 that accesses the web server of the MFP 101 through the HTTP communication.

A pull-down menu 801 is a list to switch a type of an address book displayed in the address selection screen 800. In the pull-down menu 801, one of "best member" and "abbreviated dial" (not illustrated) is selectable.

When a display switch button 802 is selected by the user, the type of the address book displayed in the address selection screen 800 is changed to the type selected in the pull-down menu 801.

An area 803 is a display area where a name of an address book is displayed. A list 804 is an area where an address list is displayed, that includes check boxes to select, numbers, types, names, and destinations. As the number, an address management number is displayed. As the type, an icon is displayed, and the icon is changed depending on the type of the address. As the name, the button name included in the address is displayed. As the destination, an address is displayed.

When an OK button 805 is selected in a state where a check box is checked, the address corresponding to the selected check box is displayed in the area 609. The MFP 101 receives the address from the PC 104 through the HTTP communication, and stores the received address as the transmission destination address for the image data in the storage 204.

The display of the selectable check box and the unselectable check box is further described. FIG. 8 illustrates a display in a case where an address is selected from an address book of "best member" in a state where "file" is selected in the pull-down menu 606 of FIG. 6. In the address book of "best member", two addresses each having a transmission type of "E-mail" and two addresses each having a transmission type of "file" have been registered. As described above, in the address selection screen 800, the destination (address) corresponding to the set transmission type is selectable by checking a selectable check box. A selectable check box is displayed for the address of which the transmission type coincides with the transmission type selected from the pull-down menu 606. More specifically, an unselectable check box is displayed for each of the addresses of numbers 01 and 02, and a checkable check box is displayed for each of the addresses of numbers 03 and 04.

The OK button 805 is a button to fix the address selection with the content set in the address selection screen. A cancel button 806 is a button to discard the set content. When the OK button 805 or the cancel button 806 is selected, the button setting editing screen 600 of FIG. 6 is displayed.

The setting of the interview sheet button 405 according to the present exemplary embodiment will be described. The interview sheet button 405 has been registered in a state where, in the button setting editing screen 600 of FIG. 6, "interview sheet" is input in the input field 601, "button name" is selected in the pull-down menu 602, and the check box 603 is checked. Also, the interview sheet button 405 has been registered in a state where, in the button setting editing screen 600 of FIG. 6, "sort (folder)" is selected in the pull-down menu 605 and "file" is selected in the pull-down menu 606. Further, the interview sheet button 405 has been registered in a state where "only numerals" is selected in the pull-down menu 701, "3" is input in the input field 702, and "10" is input in the input field 703. Furthermore, the interview sheet button 405 has been registered in a state where "interrupt" is selected in the pull-down menu 708, and an address "\\file server\interview sheet" as the destination of the number 04 is selected in the address selection screen 800 of FIG. 8.

Figure 9:
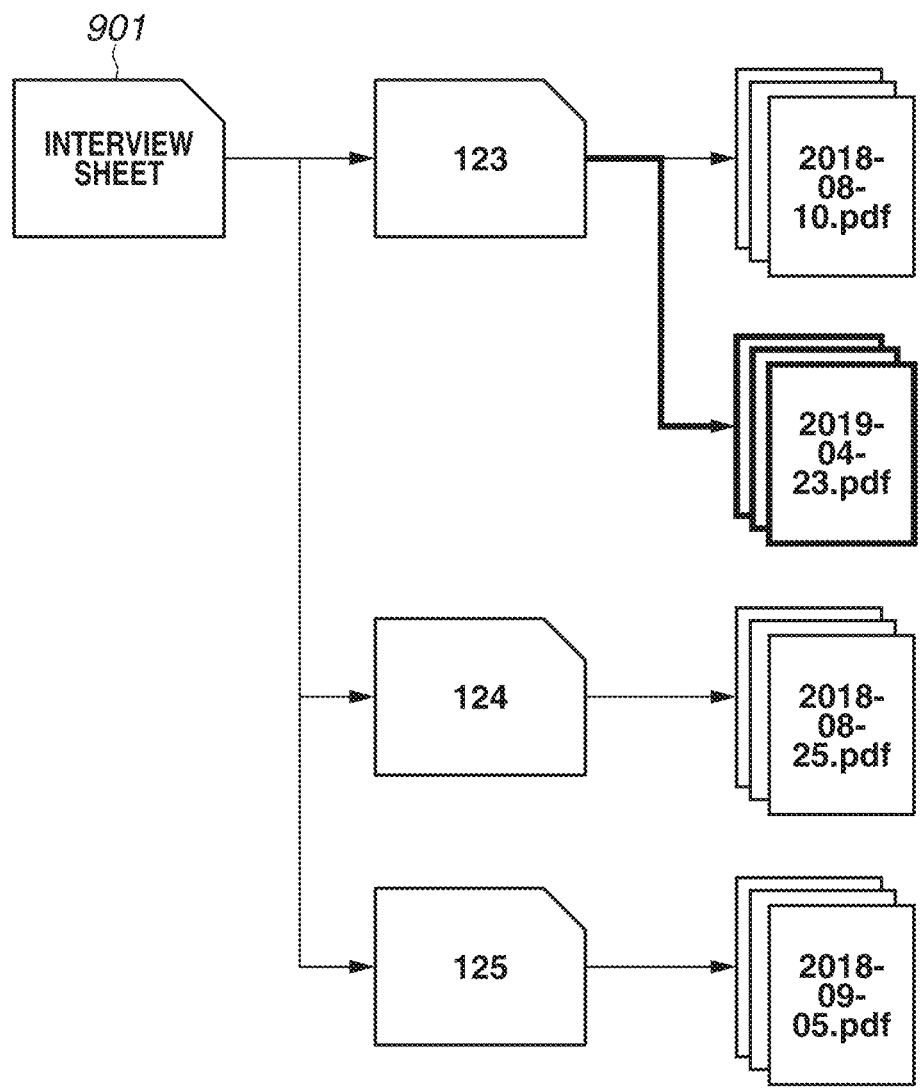
FIG. 9 is a diagram illustrating an example of a folder structure.

FIG. 9 is a diagram illustrating an example of a folder structure. FIG. 9 illustrates a folder structure of the file server 102 that is a file transmission destination in the present exemplary embodiment. The file server 102 has a hierarchical structure in which the interview sheet is stored in a folder for each patient. The file server 102 includes an interview sheet folder 901 as a highest level folder, which contains sub-holders for respective patient IDs. Under each of the sub-holders, interview sheet files each having a file name named after the date of the interview are contained. In the one-touch transmission processing described below, a file "2019-04-23.pdf" is transmitted to the folder of a patient ID "123".

In the image processing apparatus that stores the image data in a folder using, as a folder name, the character string acquired by the character recognition processing, in a case where an incorrect character string is acquired by the character recognition processing, the image data is stored in a folder having a folder name unintended by the user. Accordingly, image data of a confidential document may be transmitted to an unintended folder, which can lead to leakage of confidential information.

Meanwhile, to prevent the image data from being transmitted to the unintended folder, the folder name can be confirmed by the user before the image data is stored. However, this increases labor and complicated operation of the user.

According to the technique discussed in Japanese Patent Application Laid-Open No. 2005-234708, the folder name cannot be confirmed by the user before the image data is stored, and it is difficult to prevent the image data from being transmitted to the unintended folder.

In the image processing apparatus that stores the image data in the folder using, as the folder name, the character string acquired by character recognition processing, performing the following processing allows for reduction of labor for preventing the image data from being transmitted to the unintended folder.

Figure 10:
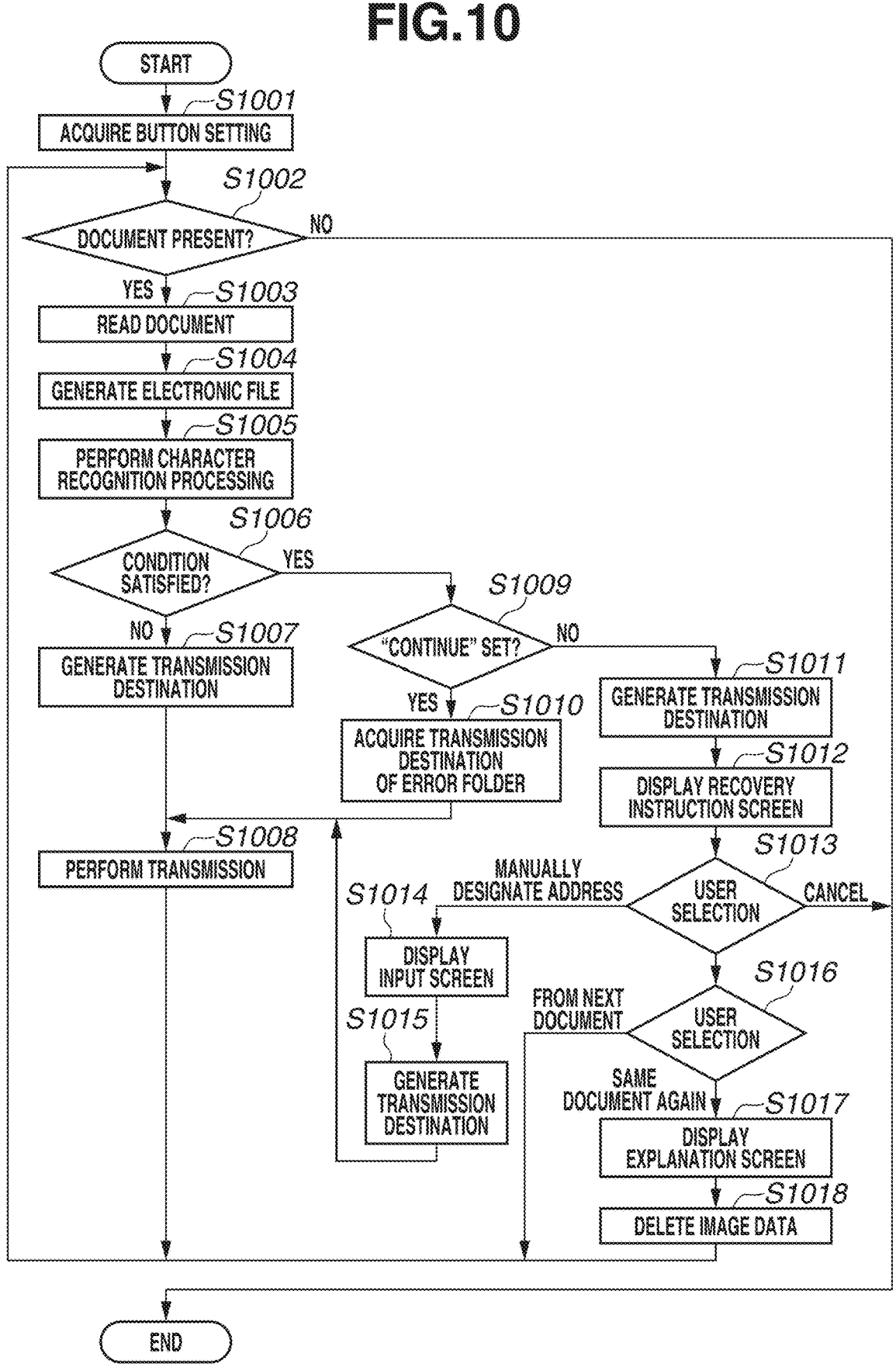
FIG. 10 is a flowchart illustrating an example of one-touch transmission scan processing.

FIG. 10 is a flowchart illustrating an example of the one-touch transmission scan processing. When the CPU 201 reads the program stored in the ROM 202 into the RAM 203 and executes the program, the processing in the flowchart of FIG. 10 is performed. The flowchart of FIG. 10 is performed in response to selection of the interview sheet button 405 by the user on the home screen 400 displayed on the operation unit 205.

In step S1001, the CPU 201 acquires the settings made to the interview sheet button 405 via the operation device 310 and the display device 311.

In step S1002, the CPU 201 determines whether a document has been placed on a document tray (not illustrated). In a case where it is determined that a document has been placed on the document tray (YES in step S1002), the processing proceeds to step S1003. In a case where it is determined that a document has not been placed on the document tray (NO in step S1002), the processing is ended.

In step S1003, the CPU 201 controls the scanner 207 to convey one of the documents placed on the document tray, and reads an image of the document to generate image data. The image data generated at this time may be binary compressed image data.

In step S1004, the CPU 201 generates an electronic file from the image data generated in step S1003 based on the setting of the file format acquired in step S1001. In the case of the interview sheet button 405, image data is generated in a PDF file format because "PDF" has been set. The image data generated in a PDF file format is stored in the storage 204.

In step S1005, the CPU 201 performs the character recognition processing on the image data generated in step S1003 based on the character recognition area set in the input fields 704 to 707 of the keyword character string setting screen 700 of FIG. 7, and acquires a character string.

In step S1006, the CPU 201 determines whether the character string acquired in step S1005 satisfies the condition set in the keyword setting screen of FIG. 7. For example, in a case where "only numerals" is selected in the pull-down menu 701 and the character string acquired as a result includes characters other than numerals, it is determined that the character string does not satisfy the condition. Also in a case where a character string having the number of characters not falling within a range from the lower limit to the upper limit of the number of characters set in the input fields 702 and 703 is acquired, it is determined that the character string does not satisfy the condition. In a case where it is determined that the character string satisfies the condition (YES in step S1006), the processing proceeds to step S1009. In a case where it is determined that the character string does not satisfy the condition (NO in step S1006), the processing proceeds to step S1007.

In step S1007, the CPU 201 generates a folder path (transmission destination) that is obtained by adding the acquired character string to a lowermost layer of the folder path displayed in the area 609. More specifically, in a case where the acquired character string is "123", a folder path "\\file server\interview sheet\123" is generated.

In step S1008, the CPU 201 transmits the image data (PDF file) generated in step S1004 to a folder indicated by the folder path generated in step S1007. More specifically, the CPU 201 performs control the image data to be transmitted to the file server by using a SMB protocol or an FTP protocol and stored in the folder indicated by the designated folder path.

In step S1009, the CPU 201 determines whether "continue" has been set in the pull-down menu 708 of FIG. 7. In a case where it is determined that "continue" has been set (YES in step S1009), the processing proceeds to step S1010. In a case where it is determined that "continue" has not been set, i.e., in a case where "interrupt" has been selected, (NO in step S1009), the processing proceeds to step S1011.

In step S1010, the CPU 201 acquires a folder path of an error folder which is set in the input field 709 of FIG. 7 and to which the image data on which the error has occurred is transmitted. The processing then proceeds to step S1008, and the CPU 201 transmits the image data (PDF file) generated in step S1004 to the folder indicated by the folder path acquired in step S1010.

In step S1011, the CPU 201 generates a folder path (transmission destination) that is obtained by adding the character string acquired in step S1005 to the lowermost layer of the folder path displayed in the area 609. For example, in a case where a character string "123" described in the document is recognized as a character string "123" by the character recognition processing, a folder path "\\file server\interview sheet\I23" is generated.

In step S1012, the CPU 201 interrupts the one-touch transmission scan processing, and controls the operation unit 205 to display a recovery instruction screen, where the folder path generated in step S1011 is displayed, on the touch panel 410 of the operation unit 205. An example of the recovery instruction screen will be described with reference to FIG. 11.

Figure 11:
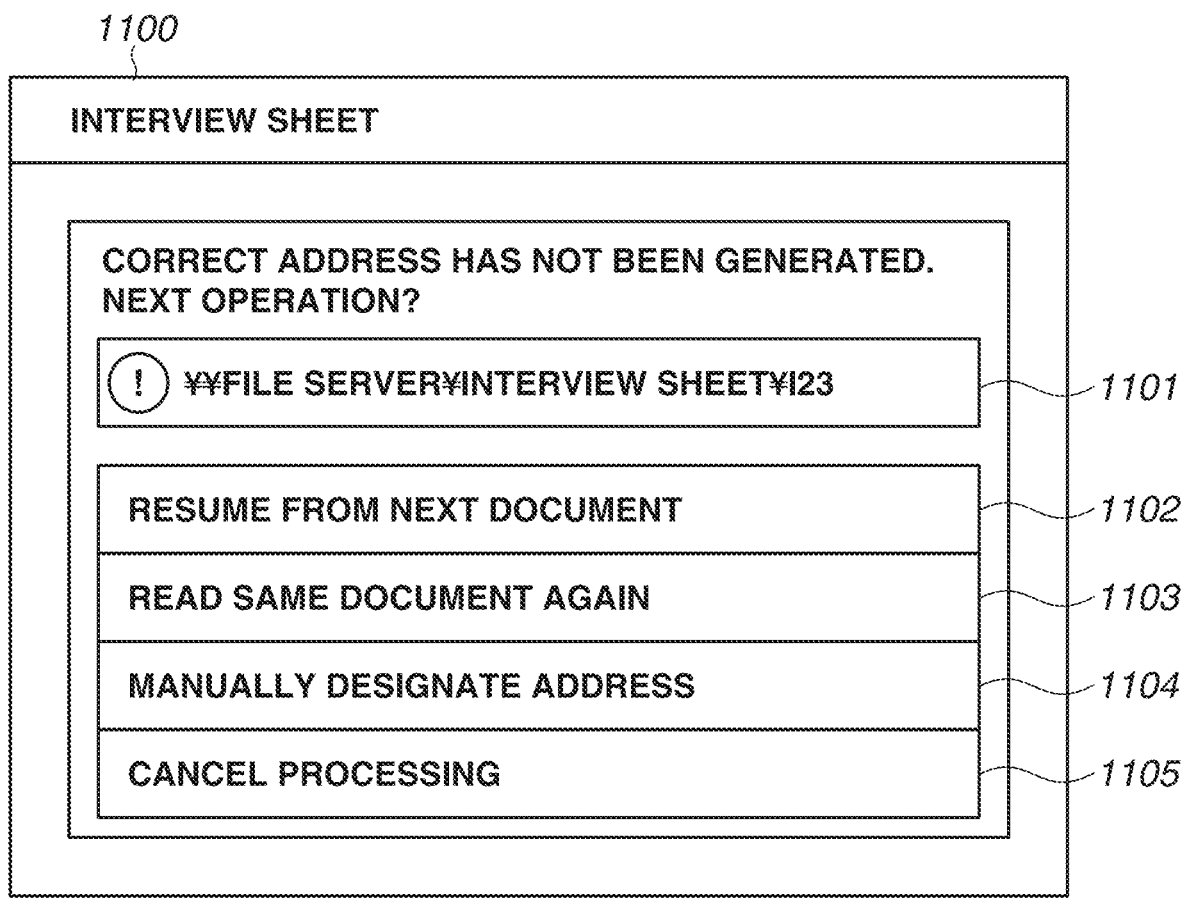
FIG. 11 is a diagram illustrating an example of a recovery instruction screen.

FIG. 11 is a diagram illustrating an example of a recovery instruction screen 1100. The recovery instruction screen 1100 that also serves as a screen indicating interruption of the one-touch transmission scan processing is displayed on the touch panel 410 of the operation unit 205 of the MFP 101.

As described above, the recovery instruction screen 1100 is displayed based on determination that the character string acquired by the character recognition processing is a character string not satisfying the set condition.

An area 1101 is an area for displaying the folder path generated in step S1011. The user checks the folder path displayed in the area to find an error in the acquired character string. Only a part of the character string not satisfying the condition may be highlighted. For example, only "I" of the character string "I23" may be displayed in red.

When a "resume from next document" button 1102 is selected by the user, the image data from which the character string to generate the transmission destination (folder path) displayed on the area 1101 has been acquired is not transmitted to the transmission destination, and scanning of the next document is started. As a result, for example, in a case where documents in different formats are mixed, the user can quickly continue the sorting processing by selecting the button 1102.

When a "read same document again" button 1103 is selected by the user, an explanation screen (not illustrated) is displayed on the touch panel 410 of the operation unit 205. By returning the document with an error to the document tray and selecting a resume button on the explanation screen in a state where the explanation screen is displayed, the user can execute reading of the same document again. For example, in a case where a handwritten character string on the document is not clear, the user corrects the character string in handwriting and executes re-reading of the document. This allow for acquisition of a correct character string. Alternatively the image of the document on which the error has occurred may be displayed on the above-described explanation screen (not illustrated).

When a "manually designate address" button 1104 is selected by the user, an input screen where the user can input a transmission destination using the keyboard or the like is displayed on the touch panel 410 of the operation unit 205. An example of the input screen where the user can input a transmission destination using the keyboard or the like will be described with reference to FIG. 12.

Figure 12:
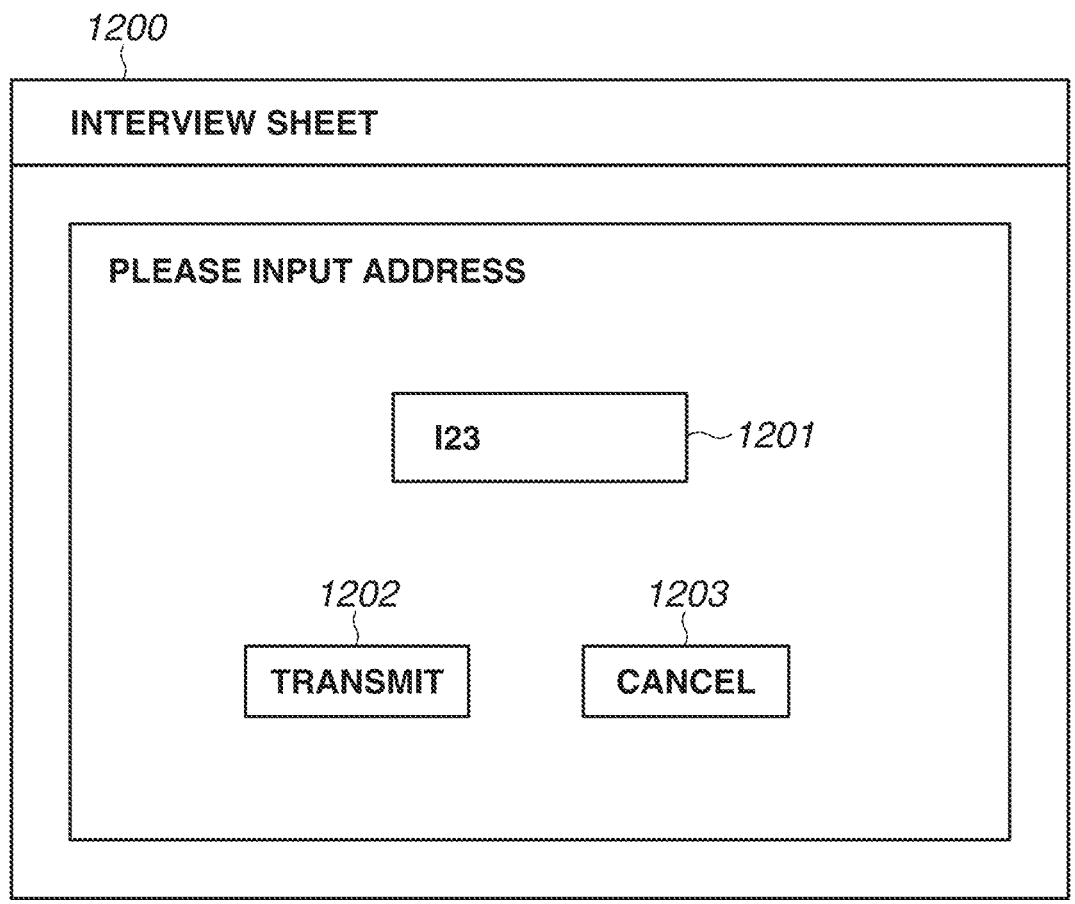
FIG. 12 is a diagram illustrating an example of an input screen.

FIG. 12 is a diagram illustrating an example of an input screen 1200. The input screen 1200 is displayed on the touch panel 410 of the operation unit 205.

An input field 1201 is an input field for the user to correct the character string used in the folder path. When the input field 1201 is selected by the user, a software keyboard (not illustrated) is displayed on the input screen 1200, and an input of the character string by the user in the input field 1201 is received.

When a transmission button 1202 is selected by the user, the image data is transmitted to the folder indicated by a folder path that is obtained by adding the character string input in the input field 1201 to the lowermost layer of the folder path displayed in the area 609.

When a cancel button 1203 is selected by the user, the character string input in the input field 1201 is discarded, and the recovery instruction screen 1100 is displayed again.

In such a manner, For example, in a case where the character recognition accuracy is insufficient, the user can input a correct character string by selecting the button 1104.

In the present exemplary embodiment, the example in which the input of the transmission destination by the user is received on the input screen 1200 different from the recovery instruction screen 1100 has been described. The configuration however is not limited thereto. Alternatively, the area 1101 of the recovery instruction screen 1100 may be an input field, and a software keyboard may be displayed when the area 1101 is selected by the user to receive an input of the transmission destination by the user. Further, in the input field 1201 of the input screen 1200, only the acquired character string is correctable according to the present exemplary embodiment. The folder path generated in step S1011, however, may be wholly correctable. In this case, the character string "\\file server\interview sheet\I23" is displayed in the input field 1201, and the processing in step S1015 is omitted.

When a "cancel processing" button 1105 in FIG. 11 is selected by the user, the generated image data is discarded, and the one-touch transmission scan processing is canceled.

The description will return to the flowchart of FIG. 10. In step S1013, the CPU 201 determines which button has been selected by the user via the recovery instruction screen 1100. In a case where the "manually designate address" button 1104 has been selected (MANUALLY DESIGNATE ADDRESS in step S1013), the processing proceeds to step S1014. In a case where the "cancel processing" button 1105 has been selected (CANCEL in step S1013), the processing is ended. In a case where a button other than the above-described buttons, the processing proceeds to step S1016.

In step S1014, the CPU 201 controls the operation unit 205 to display the input screen where the user can input the transmission destination using the keyboard or the like, on the touch panel 410 of the operation unit 205. An example of the input screen where the user can input the transmission destination from the keyboard or the like is described with reference to FIG. 12.

In step S1015, the CPU 201 generates a folder path (transmission destination) that is obtained by adding the character string input in the input field 1201 to the lowermost layer of the folder path displayed in the area 609, in response to selection of the transmission button 1202 by the user. The processing then proceeds to step S1008, and the CPU 201 transmits the image data (PDF file) generated in step S1004 to the folder indicated by the folder path acquired in step S1015.

In step S1016, the CPU 201 determines which button has been selected by the user via the recovery instruction screen 1100. In a case where the "resume from next document" button 1102 has been selected (FROM NEXT DOCUMENT in step S1016), the processing returns to step S1002. In a case where the "read same document again" button 1103 has been selected (SAME DOCUMENT AGAIN in step S1016), the processing proceeds to step S1017.

In step S1017, the CPU 201 controls the operation unit 205 to display an explanation screen (not illustrated) that prompts the user to place the document again on the touch panel 410 of the operation unit 205. The explanation screen may be a screen that prompts the user to place the last scanned document on the document tray again, or the image of the document to be placed again may be displayed on the touch panel 410 of the operation unit 205.

In step S1108, the CPU 201 deletes the image data stored in the storage 204 in step S1004 in response to selection of a resume button displayed on the explanation screen (not illustrated). The processing then returns to step S1002. In the present exemplary embodiment, the example in which the image data stored in the storage 204 is deleted has been described. However, the processing may be resumed without deleting the image data, and the image data generated again in a PDF file format may be configured not to be stored in the storage 204. In this case, the image data transmitted in step S1008 is the image data stored before the processing is resumed.

Performing the above-described processing allows the reduction of labor for preventing image data from being transmitted to an unintended folder in an image processing apparatus that stores the image data in a folder using, as a folder name, a character string acquired by character recognition processing.

A second exemplary embodiment will be described. In the first exemplary embodiment, the example in which reading of an image of a second document is started after processing for transmitting image data generated by reading an image of a first document is completed has been described. In the present exemplary embodiment, an example in which reading of an image of a second document is started before image data generated by reading an image of a first document is transmitted will be described.

Figure 13:
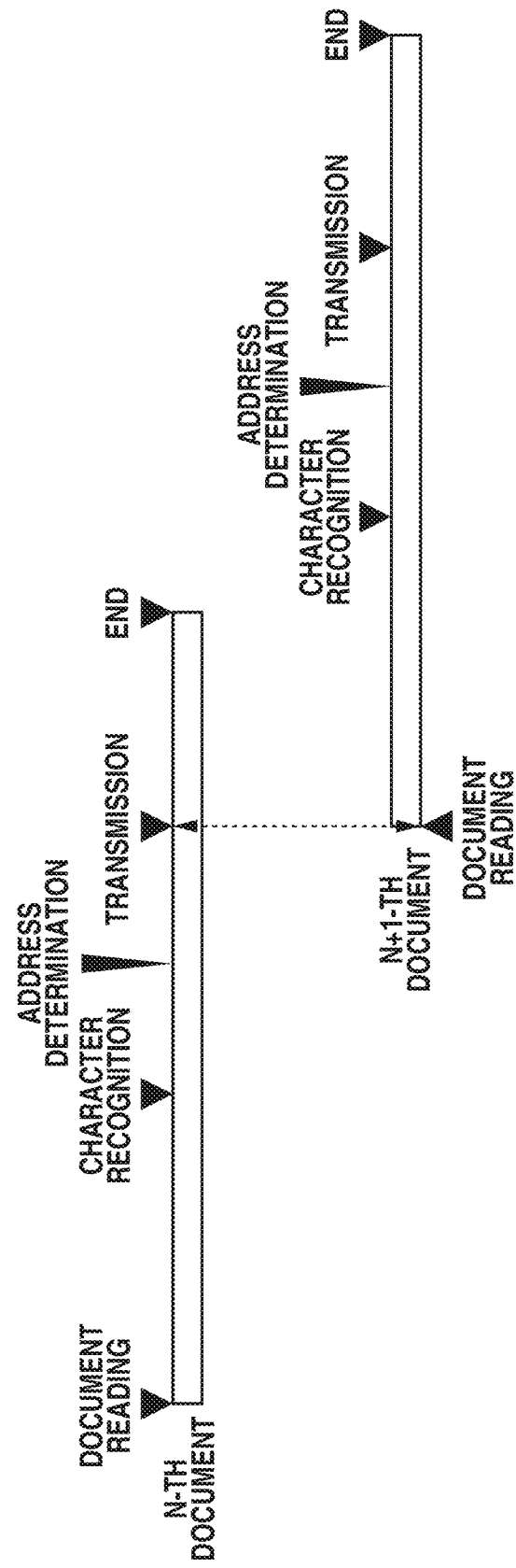
FIG. 13 is a diagram illustrating an example of a timing chart of one-touch transmission scan parallel processing.

FIG. 13 is a diagram illustrating a timing chart of one-touch transmission scan parallel processing. The processing performed on one document basically progresses in order of the processing to read an image of a document to generate image data, the character recognition processing, the transmission destination determination processing, and the transmission processing.

In the present exemplary embodiment, at timing when execution of transmission processing of an N-th document is started, processing for reading an image of an N+1-th document to generate image data is started as illustrated in FIG. 13.

Figure 14:
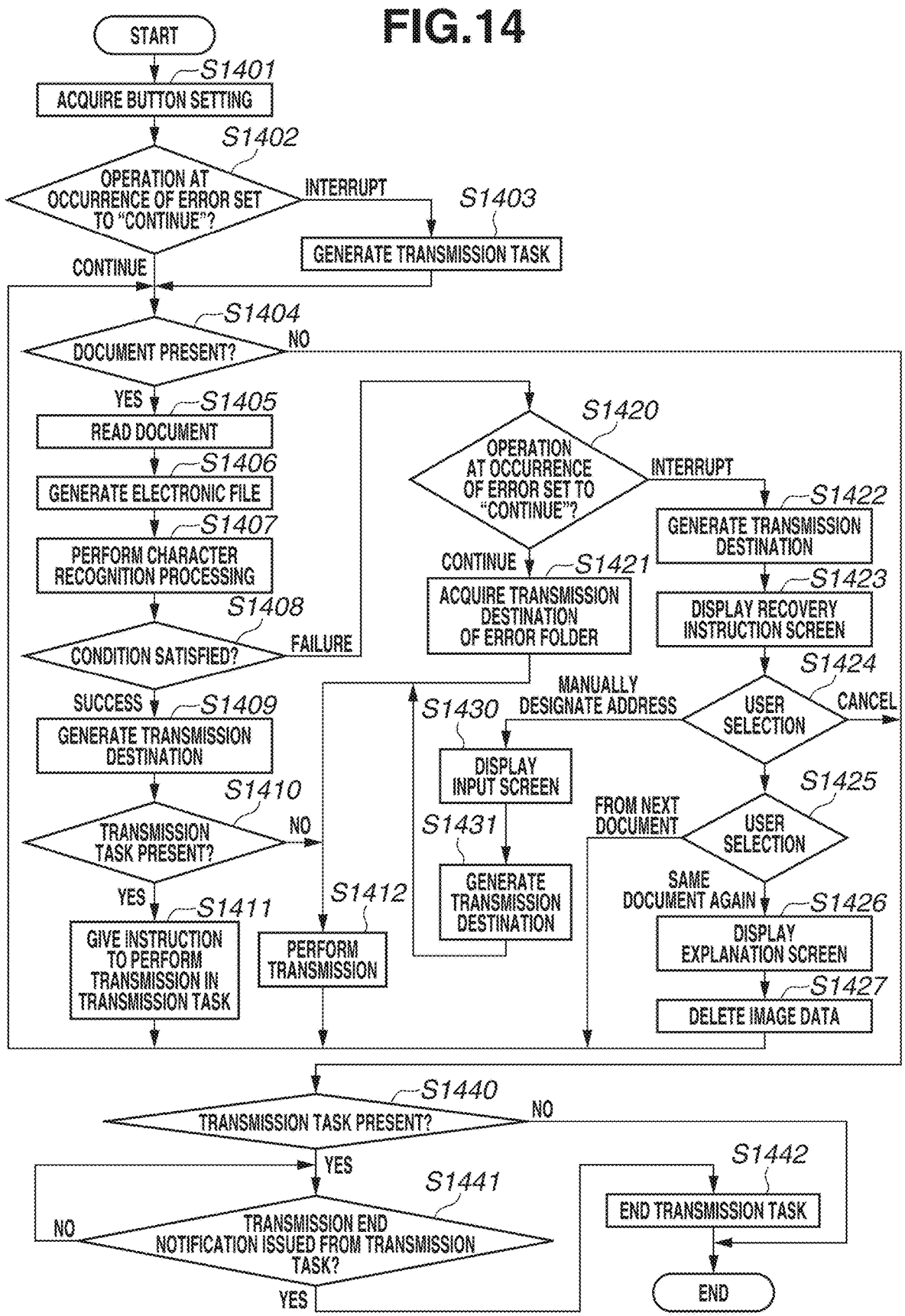
FIG. 14 is a flowchart illustrating an example of the one-touch transmission scan parallel processing.

FIG. 14 is a flowchart illustrating an example of the one-touch transmission scan parallel processing. When the CPU 201 reads out the program stored in the ROM 202 into the RAM 203 and executes the program, the processing in the flowchart of FIG. 14 is performed. The flowchart of FIG. 14 is performed in response to selection of the interview sheet button 405 by the user on the home screen 400 displayed on the operation unit 205. The following description will be given to processing different from the processing described in the flowchart of FIG. 10.

In step S1402, the CPU 201 determines whether operation to be performed at a time of occurrence of an error has been set to "continue". In a case where it is determined that the operation has been set to "continue" (CONTINUE in step S1402), the processing proceeds to step S1404. In a case where it is determined that "interrupt" has been set (INTERRUPT in step S1402), the processing proceeds to step S1403.

In step S1403, the CPU 201 generates a transmission task. The transmission task generated at this time is a task performed in a flow of processing different from this flow.

In step S1410, the CPU 201 determines whether the transmission task is present after the transmission destination is generated. In a case where it is determined that the transmission task is present (YES in step S1410), the processing proceeds to step S1411. Otherwise (NO in step S1410), the processing proceeds to step S1412. In step S1412, the CPU 201 performs transmission processing to transmit the image data to the transmission destination generated in step S1409.

In step S1411, the CPU 201 gives an instruction to transmit the image data in the transmission task generated in step S1410 and performs the transmission processing. In the transmission task, the processing in step S1412 is performed. The processing in step S1412 is similar to the processing in step S1008 in FIG. 10.

In step S1420, the CPU 201 determines whether operation to be performed at a time of occurrence of an error has been set to "continue" as with the processing in step S1402. In a case where it is determined that the operation has been set to "continue" (CONTINUE in step S1420), the processing proceeds to step S1421. In a case where it is determined that "interrupt" has been set (INTERRUPT in step S1420), the processing proceeds to step S1422.

In step S1440, the CPU 201 determines whether a transmission task is present as with the processing in step S1410. In a case where it is determined that the transmission task is present (YES in step S1440), the processing proceeds to step S1441. In a case where it is determined that the transmission task is not present (NO in step S1440), the processing is ended.

In step S1441, the CPU 201 determines whether notification indicating an end of transmission has been issued in the transmission task. In a case where it is determined that the notification has been issued (YES in step S1441), the processing proceeds to step S1442. In a case where it is determined that the notification has not been issued (NO in step S1441), the processing returns to step S1441, and the processing is repeated.

In step S1442, the CPU 201 ends the transmission task. The processing then is ended.

Performing the above-described processing allows for simultaneous execution of the transmission processing of the first document and the reading processing of the second document in parallel, thereby reducing the processing time.

OTHER EMBODIMENTS

Embodiment(s) of the present disclosure can also be realized by a computer of a system or apparatus that reads out and executes computer executable instructions (e.g., one or more programs) recorded on a storage medium (which can also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer can comprise one or more processors (e.g., central processing unit (CPU), micro processing unit (MPU)) and can include a network of separate computers or separate processors to read out and execute the computer executable instructions. The computer executable instructions can be provided to the computer, for example, from a network or the storage medium. The storage medium can include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

What is claimed is:
1. An information processing apparatus, comprising:
a controller including a processor and a memory, the controller being configured to:
on the basis that character information, that is obtained from image data generated by scan of a document, satisfies a predetermined condition regarding type of a character, perform a process for storing the image data in a folder having a folder name including one or more characters indicated by the obtained character information, and on the basis that character information, that is obtained from image data on the basis that character information, that is obtained from image data generated by scan of a document, does not satisfy the predetermined condition, perform a process for storing the image data in a folder determined before the character information is obtained.

2. The information processing apparatus according to claim 1, wherein, the controller is configured to perform, based on a determination that the character information satisfies the predetermined condition, the process for storing the image data in the folder having the folder name including the one or more characters indicated by the obtained character information, and wherein the controller is configured to perform, based on a determination that the character information does not satisfy the predetermined condition, the process for storing the image data in the folder determined by designation by a user before the character information is obtained.

3. The information processing apparatus according to claim 1, wherein the controller is configured to perform, on the basis that the character information satisfies the predetermined condition, the process for storing the image data directly under the folder having the folder name including the one or more characters indicated by the obtained character information, and wherein the controller is configured to perform, on the basis that the character information does not satisfy the predetermined condition, the process for storing the image data directly under the folder determined before the character information is obtained.

4. The information processing apparatus according to claim 1, wherein the controller is configured to obtain the character information by performing a recognizing process on the image data generated by the scan of the document.

5. The information processing apparatus according to claim 4, further comprising:

a scanner configured to scan a document to generate image data, wherein the controller is configured to obtain the character information by performing the recognizing process on the image data generated by the scanner.

6. The information processing apparatus according to claim 4, wherein the recognizing process is an OCR process.

7. The information processing apparatus according to claim 1, further comprising:

a communicator configured to:

transmit, on the basis that the character information satisfies the predetermined condition, the image data for storing the image data in the folder having the folder name including the one or more characters indicated by the obtained character information, and transmit, on the basis that the character information does not satisfy the predetermined condition, the image data for storing the image data in the folder determined before the character information is obtained.

8. The information processing apparatus according to claim 1, wherein the folder determined before the character information is obtained is a folder having a folder name not including the obtained character information that does not satisfy the predetermined condition.

9. The information processing apparatus according to claim 1, wherein the folder determined before the character information is obtained is a folder not specified based on the obtained character information that does not satisfy the predetermined condition.

10. The information processing apparatus according to claim 1, wherein the controller is configured to specify, based on the character information that satisfies the predetermined condition, the folder name of the folder for having the image data stored, and wherein the image data is stored in the folder having the specified folder name.

11. An information processing method comprising:

on the basis that character information, that is obtained from image data generated by scan of a document, satisfies a predetermined condition regarding type of a character, performing a process for storing the image data in a folder having a folder name including one or more characters indicated by the obtained character information; and on the basis that character information, that is obtained from image data generated by scan of a document, does not satisfy the predetermined condition, performing a process for storing the image data in a folder determined before the character information is obtained.

12. The information processing method according to claim 11, wherein, based on a determination that the character information satisfies the predetermined condition, the process for storing the image data in the folder having the folder name including the one or more characters indicated by the obtained character information is performed, and wherein, based on a determination that the character information does not satisfy the predetermined condition, the process for storing the image data in the folder determined by designation by a user before the character information is obtained, is performed.

13. The information processing method according to claim 11, wherein, on the basis that the character information satisfies the predetermined condition, the process for storing the image data directly under the folder having the folder name including the one or more characters indicated by the obtained character information is performed, and wherein, on the basis that the character information does not satisfy the predetermined condition, the process for storing the image data directly under the folder determined before the character information is obtained, is performed.

14. The information processing method according to claim 11, further comprising:

obtaining the character information by performing a recognizing process on the image data generated by the scan of the document.

15. The information processing method according to claim 14, further comprising:

scanning a document to generate image data, wherein the character information is obtained by performing the recognizing process on image data generated by the scanning.

16. The information processing method according to claim 14,
wherein the recognizing process is an OCR process.

17. The information processing method according to claim 11, further comprising:
transmitting, on the basis that the character information satisfies the predetermined condition, the image data for storing the image data in the folder having the folder name including the one or more characters indicated by the obtained character information; and
transmitting, on the basis that the character information does not satisfy the predetermined condition, the image data for storing the image data in the folder determined before the character information is obtained.

18. The information processing method according to claim 11, wherein the folder determined before the character information is obtained is a folder having a folder name not including the obtained character information that does not satisfy the predetermined condition.

19. The information processing method according to claim 11, wherein the folder determined before the character information is obtained is a folder not specified based on the obtained character information that does not satisfy the predetermined condition.

20. The information processing method according to claim 11, further comprising:
specifying, based on the character information that satisfies the predetermined condition, the folder name of the folder for having the image data stored,
wherein the image data is stored in the folder having the specified folder name.

21. A non-transitory computer-readable storage medium storing a computer-executable program for causing an information processing apparatus to execute a method comprising:
on the basis that character information, that is obtained from image data generated by scan of a document, satisfies a predetermined condition regarding type of a character, performing a process for storing the image data in a folder having a folder name including one or more characters indicated by the obtained character information; and
on the basis that character information, that is obtained from image data on the basis that character information, that is obtained from image data generated by scan of a document, does not satisfy the predetermined condition, performing a process for storing the image data in a folder determined before the character information is obtained.

22. The non-transitory computer-readable storage medium according to claim 21,
wherein, based on a determination that the character information satisfies the predetermined condition, the process for storing the image data in the folder having the folder name including the one or more characters indicated by the obtained character information is performed, and
wherein, based on a determination that the character information does not satisfy the predetermined condition, the process for storing the image data in the folder determined by designation by a user before the character information is obtained is performed.

23. The non-transitory computer-readable storage medium according to claim 21,
wherein, on the basis that the character information satisfies the predetermined condition, the process for storing the image data directly under the folder having the folder name including the one or more characters indicated by the obtained character information is performed, and
wherein, on the basis that the character information does not satisfy the predetermined condition, the process for storing the image data directly under the folder determined before the character information is obtained is performed.

24. The non-transitory computer-readable storage medium according to claim 21, the method further comprising:
obtaining the character information by performing a recognizing process on the image data generated by the scan of the document.

25. The non-transitory computer-readable storage medium according to claim 24, the method further comprising:
scanning a document to generate image data,
wherein the character information is obtained by performing the recognizing process on image data generated by the scanning.

26. The non-transitory computer-readable storage medium according to claim 24, wherein the recognizing process is an OCR process.

27. The non-transitory computer-readable storage medium according to claim 21, the method further comprising:
transmitting, on the basis that the character information satisfies the predetermined condition, the image data for storing the image data in the folder having the folder name including the one or more characters indicated by the obtained character information; and
transmitting, on the basis that the character information does not satisfy the predetermined condition, the image data for storing the image data in the folder determined before the character information is obtained.

28. The non-transitory computer-readable storage medium according to claim 21, wherein the folder determined before the character information is obtained is a folder having a folder name not including the obtained character information that does not satisfy the predetermined condition.

29. The non-transitory computer-readable storage medium according to claim 21, wherein the folder determined before the character information is obtained is a folder not specified based on the obtained character information that does not satisfy the predetermined condition.

30. The non-transitory computer-readable storage medium according to claim 21, the method further comprising:
specifying, based on the character information that satisfies the predetermined condition, the folder name of the folder for having the image data stored,
wherein the image data is stored in the folder having the specified folder name.

* * * * *